United States Patent [19]
Chamberlin et al.

[11] Patent Number: 5,003,575
[45] Date of Patent: Mar. 26, 1991

[54] METHOD AND APPARATUS FOR STORING AND FORWARDING VOICE SIGNALS WITH CONTROLLED ACCESS

[76] Inventors: David B. Chamberlin, 11 Hunter Ridge Rd., Monroe, Conn. 06468; Mark N. Harris, 64 Roger White Dr., New Haven, Conn. 06511; Emil F. Jachmann, 34 Harbor View Pl., Stratford, Conn. 06497; Jeremy Saltzman, 24 Highbrook Rd., Norwalk, Conn. 06851; Jy-Hong Su, 14 Hunters La., Norwalk, Conn. 06850

[21] Appl. No.: 138,186

[22] Filed: Dec. 24, 1987

[51] Int. Cl.$^5$ .................. H04M 1/65; H04M 3/38; H04M 3/50
[52] U.S. Cl. .................. 379/89; 379/247; 379/77; 379/74; 379/75
[58] Field of Search .................. 379/70, 72, 73, 74, 379/76, 77, 84, 92, 201, 214, 75; 369/24–29

[56] References Cited

U.S. PATENT DOCUMENTS

| | | | |
|---|---|---|---|
| 3,749,849 | 9/1973 | Kolpek et al. | 360/13 |
| 4,430,726 | 2/1984 | Kasday | 369/900 |
| 4,625,081 | 11/1986 | Lotito et al. | 379/88 |
| 4,677,658 | 6/1987 | Kolodny | 379/75 |

Primary Examiner—Stuart S. Levy
Assistant Examiner—James E. Tomassini
Attorney, Agent, or Firm—Robert H. Whisker; Melvin J. Scolnick; David E. Pitchenik

[57] ABSTRACT

A method and apparatus for storing and forwarding voice signals wherein a user has increased control and flexibility in distributing voice signals. In one embodiment the originator of a stored voice signal may restrict an addressee's ability to forward a message to other users. In another, the originator may limit the addressee's ability to use the voice store and forward system until such time as the addressee responds to a stored voice signal.

24 Claims, 8 Drawing Sheets

METHOD AND APPARATUS FOR STORING AND FORWARDING VOICE SIGNALS WITH CONTROLLED ACCESS

BACKGROUND OF THE INVENTION

This invention relates to systems for storage and forwarding of voice signals, commonly known as voice mail systems. More particularly, it relates to voice mail systems which have improved control of access to stored signals.

Voice mail systems are well known. Typical of such systems are the systems described in commonly assigned U.S. patent application Ser. Nos. 013,303 and 013,304; both by A. Sweet et al., or those described in U.S. Pat. Nos. 4,371,752; 4,580,012; 4,581,486; 4,602,129; 4,640,991; 4,585,406; 4,652,200; and 4,580,016; all assigned to VMX, Inc. While such system vary in capacity, and in particular capabilities offered, all share as a common subset of functions the ability to store messages intended for system users for later retrieval by those users. Each user is assigned a "mailbox" and may retrieve his messages by accessing the system and then identifying his "mailbox". In general, anyone having knowledge of the telephone numbers for the system, may leave messages, but only users having a "mailbox" may retrieve messages.

To retrieve messages a user of a typical voice mail system accesses the system over the telephone lines and, after identifying himself by mailbox number, and possibly a password, hears a recorded message produced by the system advising him of the status of his mailbox (e.g. number of messages waiting, etc.). The user may then listen to brief prerecorded portions of each message, commonly referred to as "headers" which further describe the message, for example, by identifying the originator. The user may then decide whether or not to listen to each message.

Small groups of interconnected stations, each having a capacity for the display of limited text messages are also known. Such a system is described in commonly assigned U.S. patent application Ser. Nos. 849,992; by D. Chamberlin et al. and 895,010; by N. D'Agosto et al. Such systems commonly include a microcomputer, such as an IBM PC, etc., to receive brief text messages input by an operator and to transmit these messages to each station. Also commonly, the stations are interconnected both over telephone lines, for example, through a PBX, and by conventional digital transmission lines, such as a twisted pair, for the transmission of the text messages in digital form.

While successful for their intended purpose such system have disadvantages. A particular problem is that originators of messages have little or no control over further access and distribution of a message once the message was sent. Thus, no matter how confidential a message might be, in prior art systems, an originator had way to prevent even his or her most junior subordinate from distributing copies of a message to any or all of the system users. Similarly, prior art systems offered originators of messages, no matter how senior, no way to prevent addressees from erasing a message without responding or of simply ignoring the message. Thus, in prior art systems originators cold only rely on their own authority or persuasiveness to obtain a response to a message sent on the system. Further, in prior systems once a message had been sent the originator could not edit or delete the message, no matter how conditions might change or what errors or omissions the originator might later discover.

Accordingly, it is an object of the subject invention to provide a voice mail system having increased security.

It is another object of the subject invention to provide a voice mail system having improved control by an originator of user access to stored voice signals.

It is another object of the subject invention to provide a voice mail system wherein the originator of a stored voice signal has increased control to encourage replies to a stored voice signal, and of its further distribution.

DETAILED DESCRIPTION OF THE PREFERRED EMBODIMENT

Figure 1:
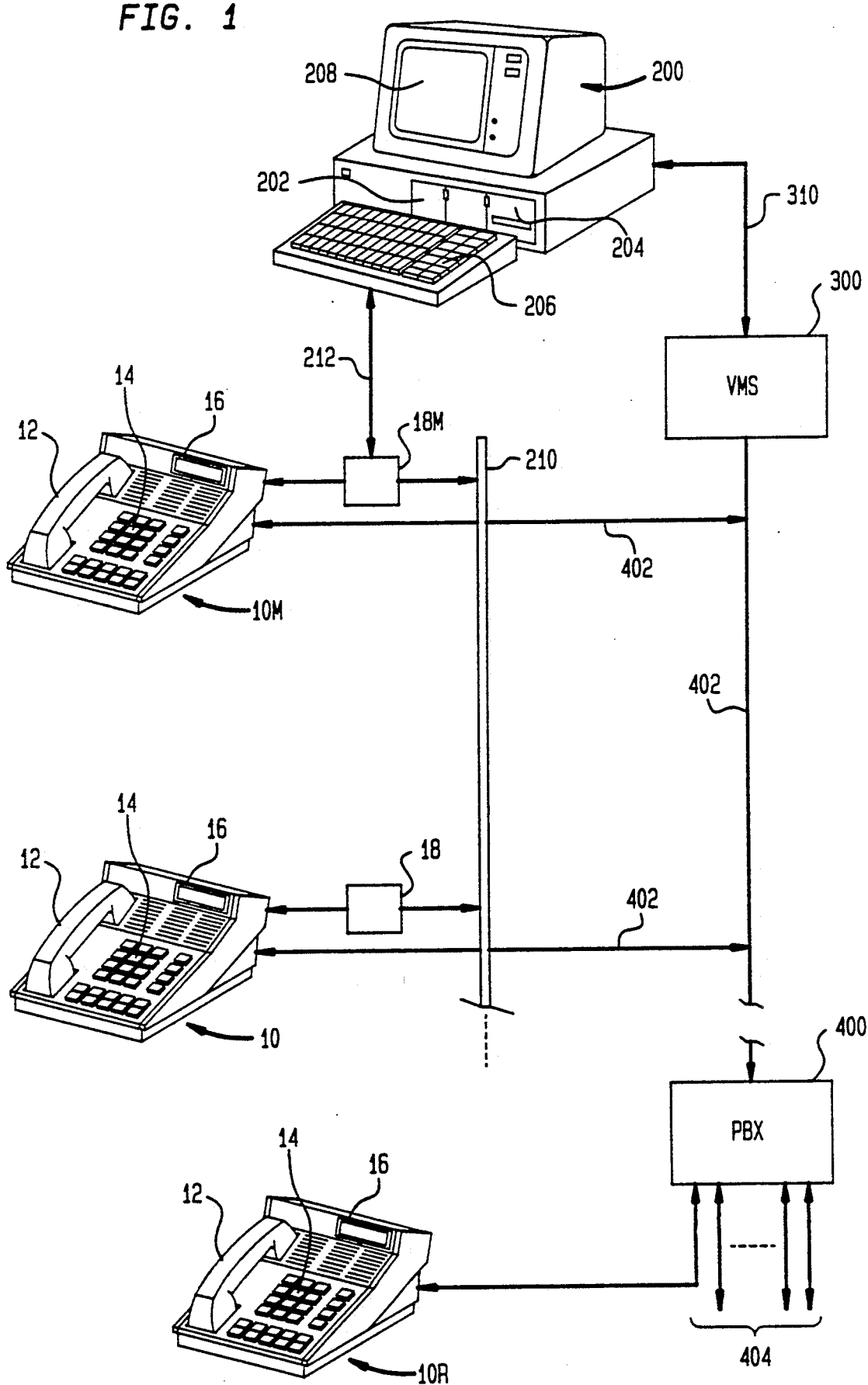
FIG. 1 shows a schematic diagram of a system in accordance with the subject invention.

FIG. 1 shows a schematic diagram of a system in accordance with the subject invention. A plurality of telephone-like stations 10, including a master station 10m, provide input and output for voice signals through handset 12, input various control signals through keyboard 14 and display text messages on the display 16. The system may also comprise remote station 10r connected over the telephone system. Station 10m is connected through interface 18m to microcomputer 200. Computer 200 includes floppy disk drives 202, hard disk 204, keyboard 206 and CRT display 208, and is preferably a well known conventional microcomputer such as the IBM Model PC AT marketed by the IBM Corporation of Armonk, N.Y.

Computer 200 and station 10m are connected to digital data path 210 for the transmission of text messages and other digital information in a conventional manner well known to those skilled in the art. Data path 210 also provides a digital transmission path between stations 10 and computer 200.

Computer 200 is further connected to voice message system (VMS) 300 over a data link 310.

PBX 400 is connected to stations 10m, 10 and VMS 300 over internal telephone lines 402. Lines 402 allow transmission of voice signals to or from any of stations 10m, 10, and VMS 300, and PBX 400 in a conventional manner well understood by those skilled in the art. PBX 400 also allows connection of remote input devices such as station 10r and other conventional telephone stations to the system over external telephone network 404.

PBX's are, of course, extremely well known devices for switching telephone signals whose operation is well understood by those skilled in the art and which need not be discussed further here for an understanding of the subject invention.

The above system is more fully described in the commonly assigned, co-pending U.S. patent application entitled METHOD AND APPARATUS FOR VISUAL INDICATION OF STORED VOICE SIGNALS; by: D. Chamberlin et al.(Ser. No. 07/128254). While the above described system is preferred for use with the subject invention, those skilled in the art will recognize that the subject invention may be readily adapted to any of the known commercially available voice store and forward systems such as those marketed by various ones of the regional telephone operating companies.

Figure 2:
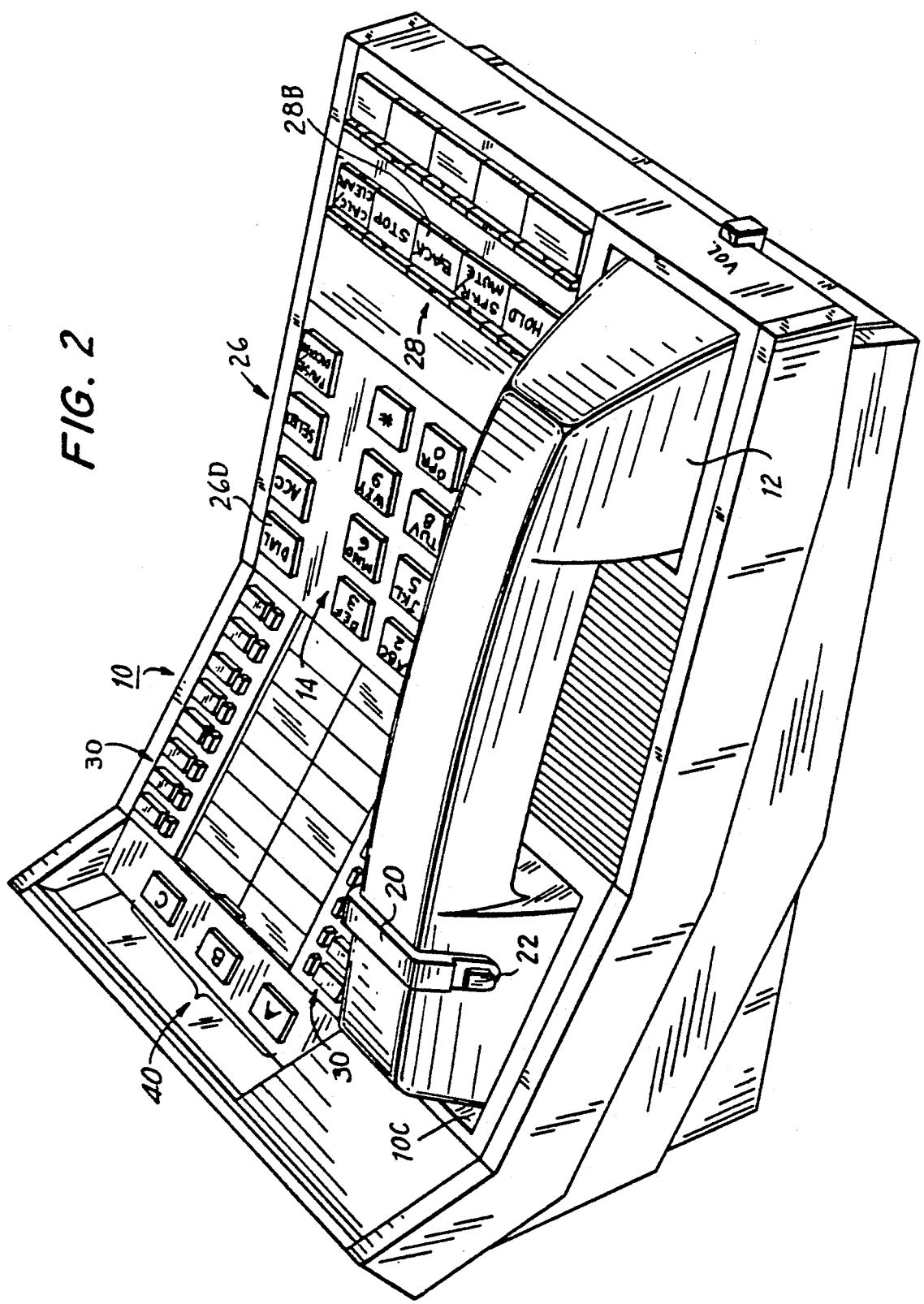
FIG. 2 shows a perspective view of a station set 10 in accordance with the subject invention.

FIG. 2 shows a perspective view of station set 10 in accordance with the subject invention. Set 10 is structurally substantially identical to the "C" units described in commonly assigned co-pending U.S. patent application Ser. No. 895,017; to: Chamberlin et al. Station set 10 is provided with a handset 12 having a speaker and microphone, similar to handsets normally provided in conventional telephone instruments. Handset 12 is held in a cradle 10c integral to the top panel of station set 10, and which cradle includes a hook switch (not shown) whose function is substantially identical to the conventional hook switch normally provided in telephones. Handset 12 differs from conventional handsets in that it has a control yoke 20 and a control button 22. Yoke 20 and button 22 are useful when station set 10 is to be used with a dictation unit, as is more fully described in the above referenced commonly assigned patent application and are used in recording replies to stored voice signals as will be more fully described below. A handset such as handset 12 is shown in U.S. Pat. No. 3,872,263 assigned to the assignee of the present invention. On the top panel of station set 10 various keys are located, including conventional push button telephone keypad 14, preset function keys 26 and 28, user-programmable keys 30, and "soft" keys 40. Station set 10 further includes a conventional Dual Tone Multiple Frequency (DTMF) signal generator which generates control signal tones which may be transmitted over the telephone system to "dial" a telephone number or for the purpose of controlling various remote systems over the telephone system. These DTMF signals are used in accordance with the subject invention in a manner which will be described more fully below.

Those skilled in the art will, of course, recognize that station set 10 preferably will also include conventional telephony and dictation functions such as are commonly known and/or are described in the above referenced commonly assigned U.S. patent application, however, descriptions of such functions are, in general, not believed necessary to an understanding of the subject invention and will not be discussed further here except to such limited extent as they may interact with capabilities of the subject invention.

Figure 3:
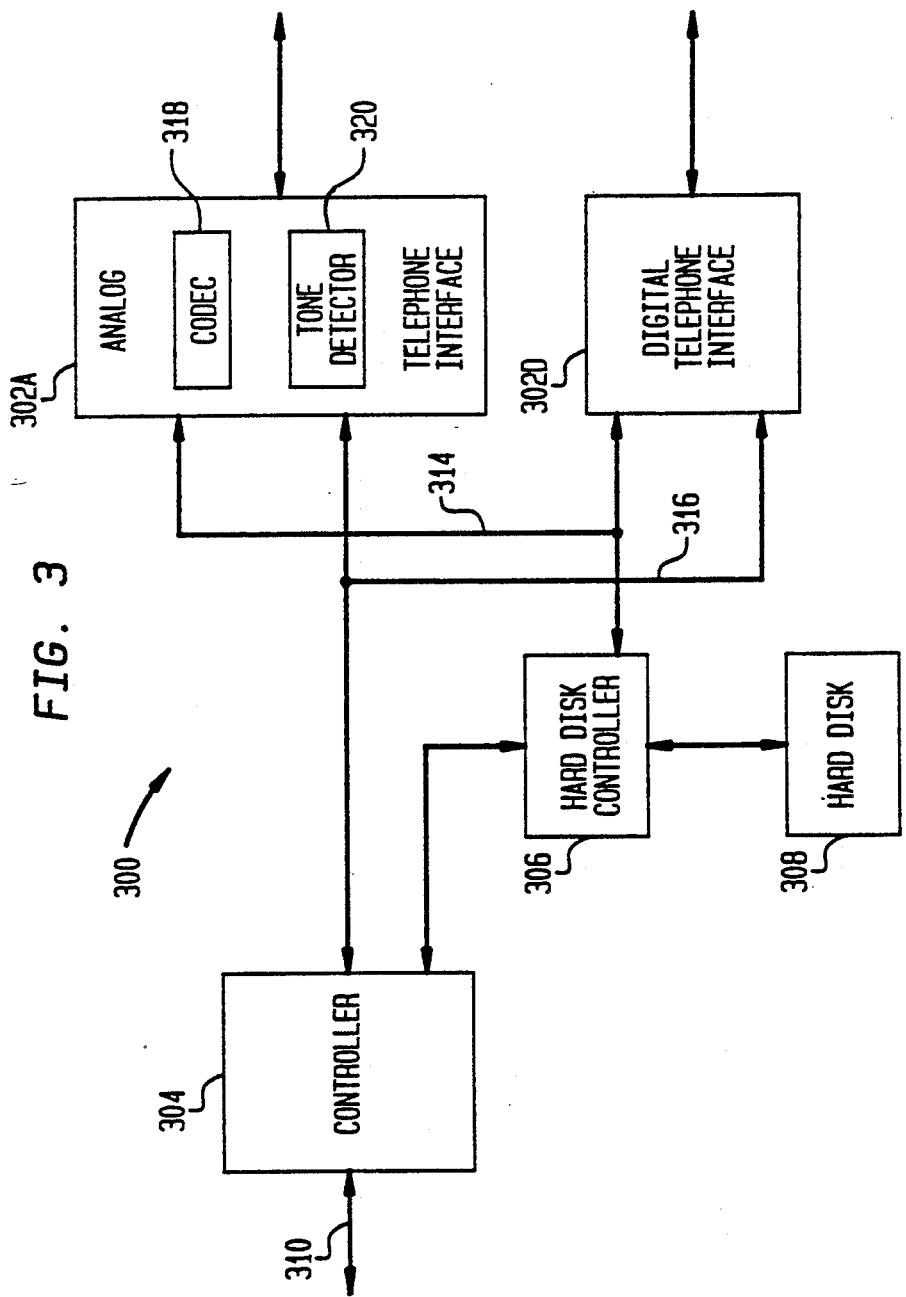
FIG. 3 shows a schematic block diagram of voice mail system 300.

FIG. 3 shows a schematic block diagram of voice mail system 300. As noted above, voice mail system are known and the system of FIG. 3 will be described in simplified terms without reference to details of design which are not necessary for an understanding of the subject invention. Voice mail systems may be considered as comprising three essential elements: telephone interfaces 302, controller 304 and a mass storage device shown in FIG. 4 as a hard disk controller 306 and hard disk 308. Telephone interfaces 302 receive voice signals over telephone lines and convert them to appropriate digital format for storage and later retrieval on disk 308. Interfaces 302 also perform such conventional telephony operations such as ring detection, dial signal generation, etc. Interfaces 302 may be either analog, interface 302a; or digital, interface 302d. Analog interface 302a receives voice signals in analog form as well as control signals in DTMF form and includes a "codec", (a form of analog-to-digital convertor used in telephony) 318 and a tone detector 320, to convert the received signals to appropriate digital form. Digital interface 302d is designed to receive voice signals as well as control signals in a digital form specified by one of the various vendors of digital telephone equipment. In either case, control signals from interfaces 302 are transmitted to controller 304 over control bus 316 while voice signals, converted to an appropriate digital format are transmitted through disk drive controller 306 to disk 308 over data bus 314. Controller 304 responds to various control signals to control interfaces 302 and controller 306 to identify various voice signals with selected addresses and store them on disk 308 for later retrieval. Such operation of voice message systems is known and is described in the above referenced commonly assigned U.S. patent application Ser. No. 013,303 and 013,304 as well as the above referenced U.S. Pat. No. 4,371,752. While hereafter descriptions of the subject invention will be given in terms of DTMF signals, those skilled in the art will recognize that an all digital embodiment where tone control signals would be replaced by digital control signals would be well within the ordinary skill in the art.

Figure 4:
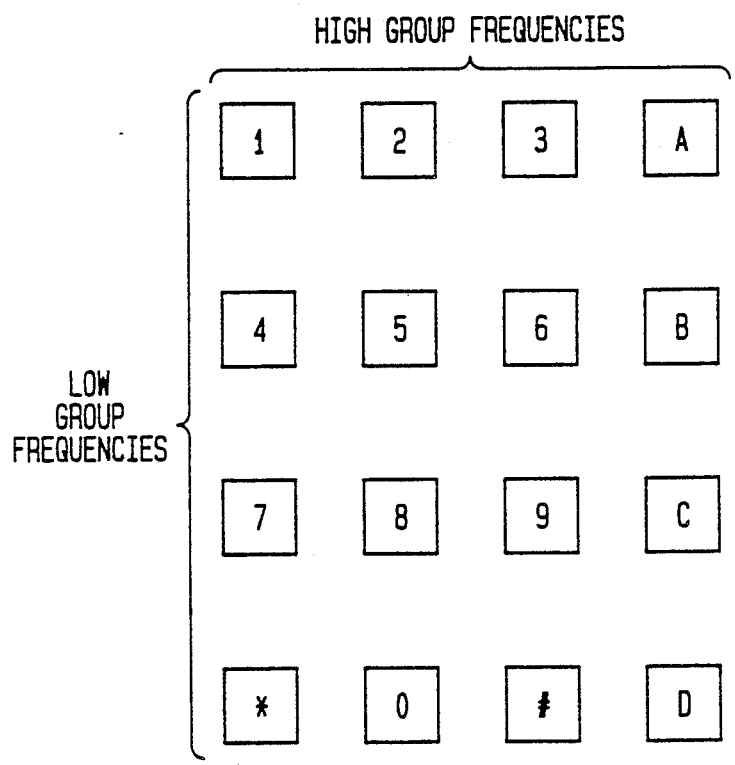
FIG. 4 shows a generalized DTMF keyboard, such as is commonly used on conventional push button telephone sets.

FIG. 4 shows a generalized DTMF keypad, such as is commonly used on conventional push button telephone sets. When any button in the keypad is depressed, two frequencies, one from a predetermined high group of frequencies, and one from a predetermined low group of frequencies are selected and combined to generate a unique tone signal. Each group of signals consists of four distinct frequencies; providing a total of 16 unique tones. Typically, telephone sets will only use three of the four frequencies in the high group to provide tones for the digits 0-9 and the "star" and "pound" keys; however, conventional commercially available tone generators and detectors will recognize all 16 tones, which are shown in FIG. 4 as additional keys a,b,c, and d.

Figure 5:
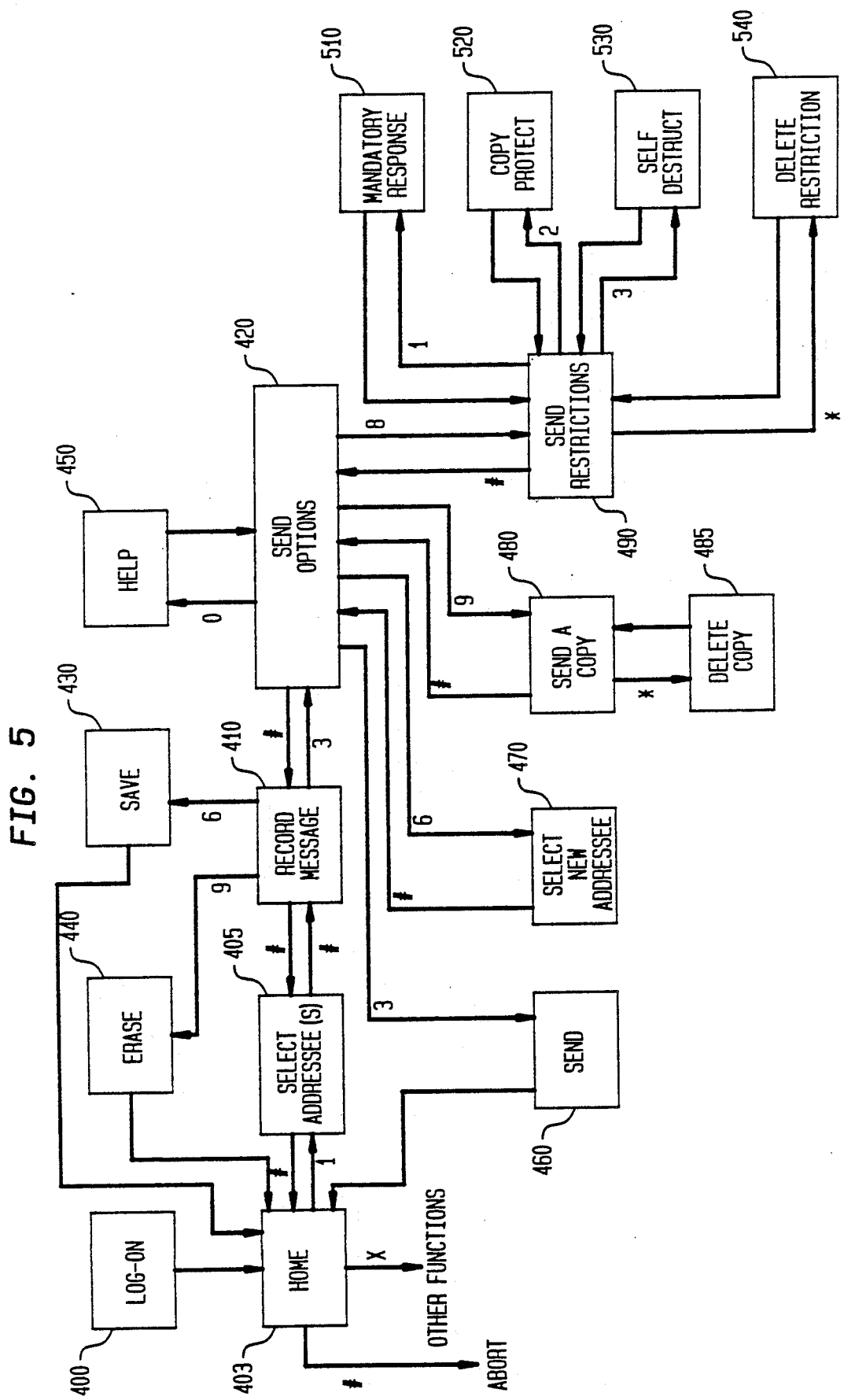
FIG. 5 shows a state diagram of the operation of a system in accordance with the subject invention.

In a preferred embodiment of the subject invention, tones b,c, and d are generated by yoke 20 and control button 22 to provide a particularly conveniently manner of controlling voice mail system 304 in accordance with the subject invention. More particularly, DTMF tones are generated by yoke 20 and button 22 as follows:

Pressing button 22—generates a D tone
Releasing button 22—generates a B tone
Pushing yoke 20 up—generates a 7 tone
Pushing yoke 20 down—generates a C tone
Releasing yoke 20 from either position—generates a B tone FIG. 5 shows a state diagram of the operation of a system in accordance with the subject invention. In each state, the system performs a selected function. Thus, for example, in state 410 the system performs a conventional record function. Those skilled in the art will recognize that the various functions carried out at each state shown in FIG. 5 are, in general, conventional functions which have been implemented in numerous commercially available voice mail systems and/or digital dictation systems; and that the sequence of transitions shown in FIG. 5 implements a novel and advantageous functionality not previously known. Accordingly, it is believed that a detailed description of the implementation of the various functions provided by the apparatus of the subject invention is not necessary for an understanding of the subject invention. It will also be understood by those skilled in the art that system 300 will preferably provide verbal and/or text prompts to a user for each new state to advise the user of the transitions available;. and, possibly, of any intermediate inputs necessary to complete the function.

At 400 in FIG. 5, a user will log-on and enter Home state 403, from which various system functions may be selected. If the user wishes to record a voice signal he or she enters a one tone and selects an addressee (or addressees) at 405 for a message he or she wishes to record. Log-on and selection of addressees is a necessary and conventional part of all voice mail systems, and the precise details of implementation do not form a part of the subject invention. Once an addressee is selected at 405 the user enters record state 410 by inputting a "pound" tone to record the message. Recording of messages in voice mail systems is also well known in the art and a detailed description is not believed necessary for an understanding of the subject invention.

After the user has completed recording his or her message, the user may enter Send Options state 420 to select options for delivery of the message to the selected addressee by generating a three tone. Or, after the message is recorded, the user may save the message at 430, and then return to record state 410, by entering a six tone. Similarly, the message may be erased at 440 by entering a nine tone. After execution of either Save or Erase, the system goes to Home state 403 to allow the user to select the next system function for execution.

(It should be understood in FIG. 5 that transitions from states, such as state 430, which are not shown with an associated command, are executed automatically upon completion of the function. Also, it should be noted that the system is preferably designed, as is known in the art, so that, in general, input of a "pound" tone causes a return to a previous state and a succession of "pound" tones will ultimately cause the system to abort.)

Returning to Send Options state 420, the user may enter a Help state 450 by executing a 0 command. In state 450 extensive prompts are played to advise the user of the options available. More preferably, in state 450, prompts will explain the restrictions which may be placed on the access of the selected addressee in Send Restriction state 490, as will be further described below. (Though only a single "Help" state is shown for ease of illustration, those skilled in the art will recognize that "Help" functions are generally known and are generally accessed in various system states through a single preselected tone, such as 0, with prompts provided varying in accordance with the system state when "Help" is accessed.)

From Send Options state 420, the user also may enter Send state 460 by entering a three command. In state 460 the recorded message will be sent to the selected addressee in a well known conventional manner, and further detailed description of this function is not believed necessary to an understanding of the subject invention.

In state 420, the user may enter a Select New Addressee state 470 to substitute one or more new addressees for the original selected addressee. In this state the system will prompt the user to enter ID's for the new selected addressee(s) and when all ID's have been entered, the user may return to state 420 by entering a "pound" command. When the system enters Send state 460, the message will now be sent to the new addressee.

The user may enter a nine command in state 420 to enter Send a Copy state 480 to send a copy of the message to another system user. Upon entering date 480, the user will be prompted to enter ID's for one or more addressees to receive copies of the recorded message. A copy is distinguished from a message by a predetermined header appended to the copy which identifies it as a copy of a message intended for another user which is sent to the copy addressee for informational purposes. When all copy addressees have been selected, the user may send the copy and return to state 420 by entering the "pound" command. At anytime in state 480, the user may delete the copy at 485 by entering the "star" command.

By entering an eight command in state 420, the user may enter a Send Restrictions state 490 to select restrictions on the access by the selected addressee to the message. In state 490 entering a one command labels the message as requiring a mandatory response. Labelling of a message as requiring a mandatory response, restricts the selected addressees ability to do anything with the message except provide a reply. At a minimum, the addressee would be restricted from erasing the message until a reply had been provided, as will be more fully described below. Entering a two command in state 490 causes the message to be labelled as copy protected at 520. A message labelled as copy protected may not be forwarded to any other system user. Entering a three command in state 490 causes the message to be labelled as a self destruct message at 530. A message labelled self destruct will automatically be erased after access by the addressee. Finally, entry of the "star" command in state 490 deletes all previous restrictions on the message at 540.

In a preferred embodiment of the subject invention, the mandatory response restriction placed on the message at 510 may be selected from one of a plurality of levels. At the lower levels, the addressee may simply be inhibited from erasing the message until he or she has generated a reply. At higher levels, further restrictions may apply, and the addressee may be inhibited from forwarding the message, saving the message, etc. In the most extreme case, the user may be completely inhibited from using the voice mail system until he or she provides a reply to the message. While those skilled in the art will recognize that selection of various levels of mandatory response could easily be done by input of intermediate commands at 510, it is desirable that the system restrict the levels of mandatory response which can be applied. Thus, it would be appropriate for a senior executive to place a mandatory response restriction on an important message sent to a subordinate, while it might be inappropriate for the subordinate to place such a restriction on his reply. Preferably, such limitations are implemented by a system supervisor using appropriate system menus. Similar system limitations on placing copy protect and self destruct limitations are also preferable.

Figure 6:
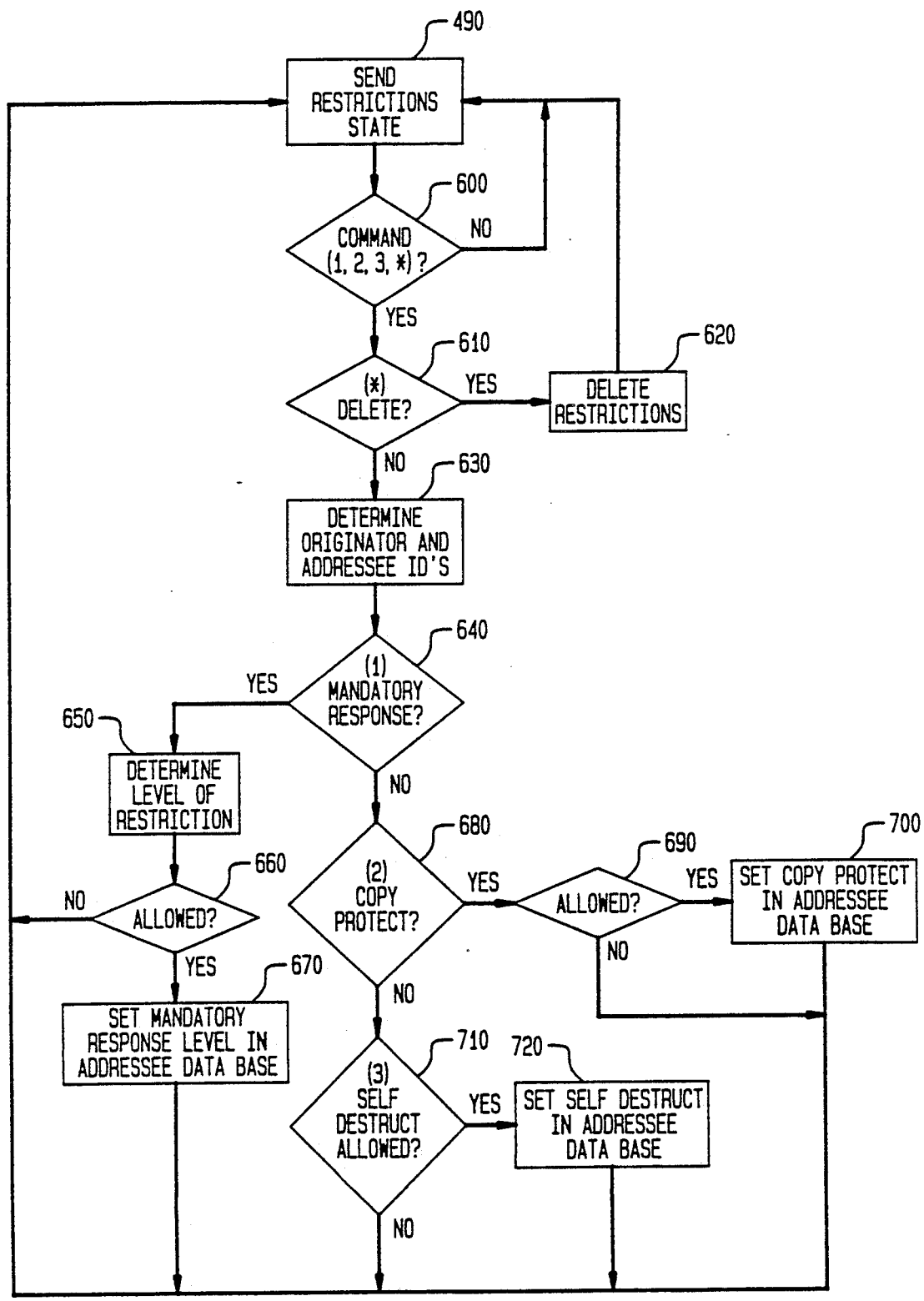
FIG. 6 shows a flow chart of the operation of a system in accordance with the subject invention in restricting access to recorded messages.

FIG. 6 shows a flow chart of the operation of a system in accordance with the subject invention in restricting access to recorded messages. In Send Restrictions state 490, at 600 the system checks for input of a command. If no command is detected, the system continues to loop in state 490 until a restriction command (one, two, three, "star") is entered, or until a "pound" command is entered to return to state 420, or until a timeout occurs.

Once a command is detected at 600, the system tests at 610 to determine if it is a delete ("star") command. If it is, at 620 the system deletes all previous restrictions on the message, and returns to 490.

If the command is not a delete command, at 630 the system test to determine the identity (or relative hierarchal position) of the originator and of the addressee. Then, at 640 the system test to determine if the command is a mandatory response command (one). If the command is a mandatory response command, at 650 a system determines the level of mandatory response restriction which may be allowed on messages from that originator to that addressee. If no mandatory response restriction is allowed at 660, the system returns to 490. If a mandatory response restriction is allowed at 670, the system records the appropriate response level in a data base maintained for the selected addressee. Note that the appropriate response level may be determined from the identities of the originator and the selected addressee, or may be determined, in part, by intermediate commands (not shown) input at 510 in FIG. 5. After recording the appropriate mandatory response restriction levels, the system returns to 490.

If the command is not a mandatory response command, at 680 the system test to determine if it is a copy protect (two) command. If it is, at 690 a system test to determine if copy protect is allowed between that originator and that addressee. If it is not, the system returns to 490 and if it is, at 700 the system sets a copy protect flag in the addressee database.

Finally, at 710 the system determines if a self destruct restriction is allowed between that originator and that addressee. If not, the system returns to 490, and if it is allowed, the system sets a self destruct flag in the addressee database and then returns to 490.

Figure 7:
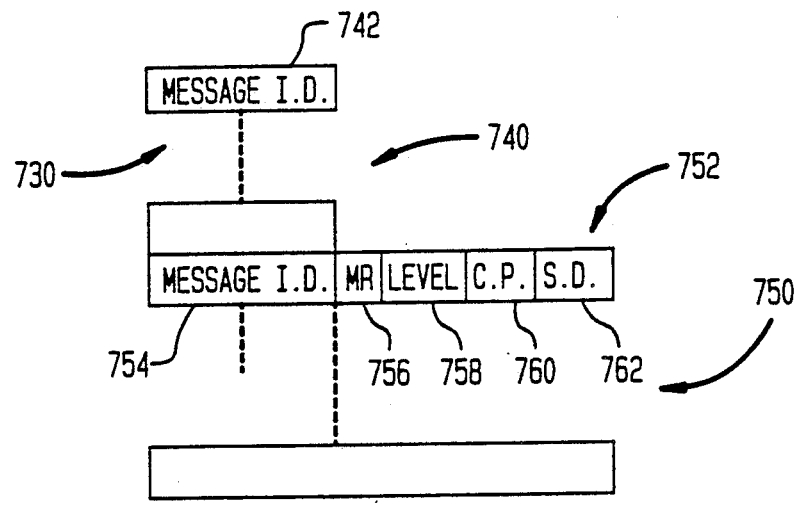
FIG. 7 shows a schematic representation of the addressee database 730 where the restrictions on access to the message are recorded.

FIG. 7 shows a schematic representation of the addressee database 730 where the restrictions on access to the message are recorded. Database 730 consists of two sub-databases. A sub-base field 740 where message ID's for messages having the highest level of mandatory response, where the addressee cannot access the voice mail system at all accept to provide a reply, are recorded in records 742. Such highest level of mandatory response is hereinafter sometimes referred to as absolute response.

Sub-base 750 consist of records recording lower levels of mandatory response and of copy protect and self destruct restrictions. These restrictions are recorded in records 752 which consist of a message ID field 754, a mandatory response flag 756, a mandatory response level field 758, a copy protect flag 760, and a self destruct flag 762.

Figure 8:
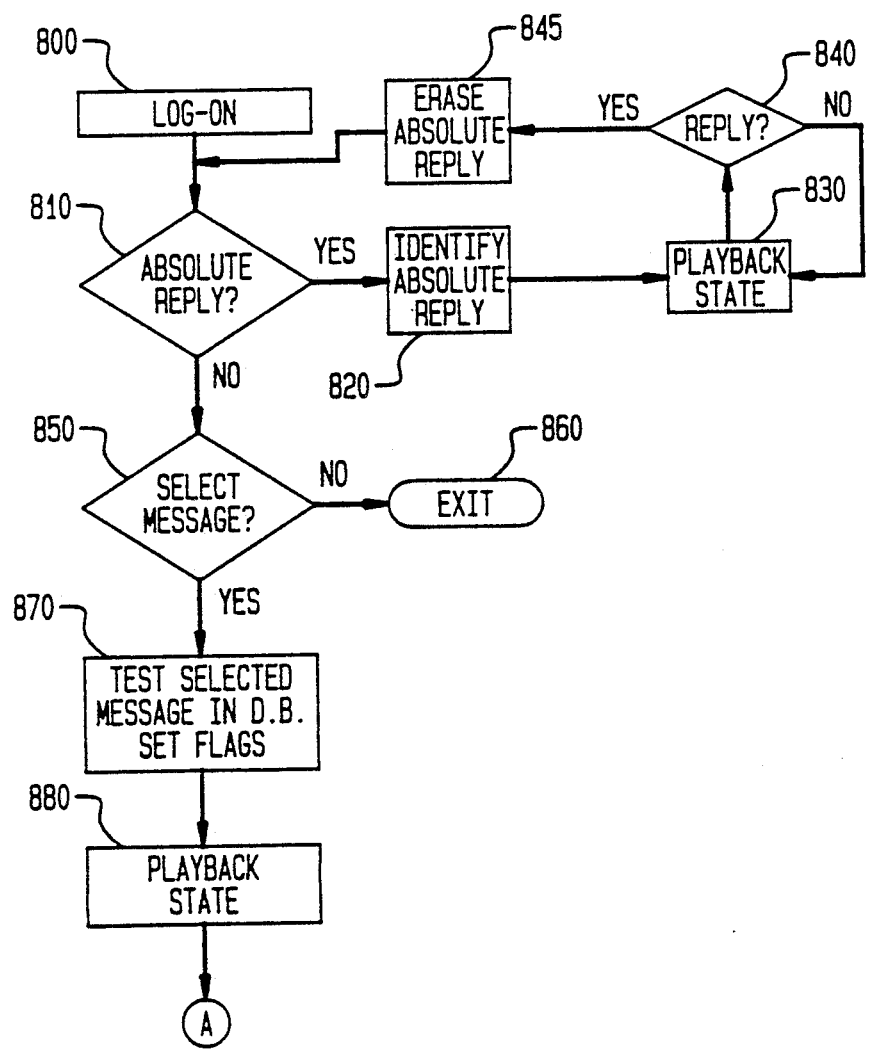
FIGS. 8 and 8A show flow charts describing the operation of a voice mail system in accordance with the subject invention in controlling access by an addressee to a message.
Figure 8A:
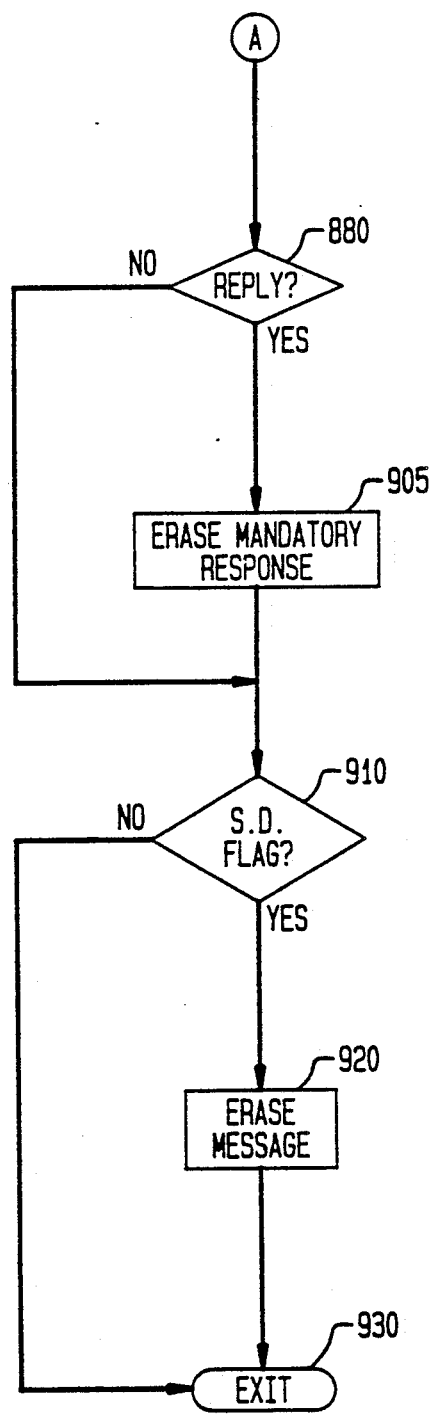

FIG. 8 shows a flow chart of the operation of a voice mail system in accordance with the subject invention in controlling access by an addressee to a message. At 800 the user logs on in a conventional manner. At 810 the system checks sub-database 730 to determine if any messages have an absolute reply restriction. If there are, at 820, the system identifies the message requiring an absolute reply and then at 830 enters a playback state. At 840 the system monitors to determine if the user has provided a reply. If he or she has not, the system continues to loop through playback state 830 until the user either provides a reply or exits the system. If the user does reply, the system erases corresponding record 742 and returns to 810 to test for further absolute reply restrictions. (In another embodiment of the subject invention a user has unrestricted access to the system until he or she attempts to access a voice signal having fan absolute reply restriction, upon which the restrictions described above are applied.)

Once all absolute reply restrictions are removed, at 850 the system determines if the user has selected a message for playback. If the user has not, but has entered some other service of the voice mail system, such as sending an original message, the system exits at 860. If the user has selected a message for playback, the system tests associated record 752 in sub-database 750 and sets flags appropriately to inhibit various functions during playback of the selected message. The system then goes to playback state 880 to play the selected message back.

After playback of the selected message, at 890 the system tests to determine if a reply has been provided. If it has, the system erases the mandatory response flag 756, if necessary, from corresponding record 752 at 900. Then, in either event, at 910 the system tests to determine if a self destruct flag has been set. If it has, at 920 the system erases the message, and in either event, then exits at 930.

The above description of a preferred embodiment of the subject invention has been provided by way of illustration only, and those skilled in the art will recognize numerous other embodiments from the detailed description given above and the attached drawings. Thus, limitations on the scope of the claimed invention are to be found only in the claims set forth below.

What is claimed is:

1. Apparatus for storing and forwarding voice signals, comprising:
   (a) voice mail means for storage and retrieval of said voice signals, said voice mail means having a send state for sending a previously stored voice signal to a selected addressee, a send restrictions state for selection of restrictions on said addressee's access to said stored voice signal, and a send options state for selection of options for processing said stored voice signal;
   (b) station means for input and output of said voice signals;
   (c) said station means further comprising signal input means for input of first and second control signals, said first control signal controlling said voice mail means to exit said send options state and enter said send state, and said second control signal controlling said voice mail means to exit said send options state and enter said send restrictions state, said voice mail means being further for responding, in said send restrictions state, to a further control signal from said station means to restrict said addressee's access to said stored voice signal.

2. Apparatus as described in claim 1, wherein said voice mail means is responsive to said further control signal to place a mandatory response restriction on said stored voice signal, said voice mail means thereafter responding to said mandatory response restriction to restrict access by said addressee to at least the extent that said addressee cannot erase said stored voice signal until said addressee has recorded a reply voice signal to said stored voice signal.

3. Apparatus as described in claim 2 wherein said voice mail means is responsive to said further control signal to place one of a plurality of levels of mandatory response restriction on said stored voice signal.

4. Apparatus as described in claim 3 wherein said voice mail system is responsive to said further control signal to select one of said levels of restriction as a function of the identity of the originator of said stored voice signal, or of said addressee, or of both identities.

5. Apparatus as described in claim 1, wherein said voice mail means is responsive to said further control signal to place a copy protect restriction on said stored voice signal, said voice mail means thereafter responding to said copy protect restriction to restrict said addressee from forwarding said stored voice signal to other system users.

6. Apparatus as described in claim 5, wherein said voice mail means is responsive to a function of the identity of the originator of said stored voice signal, or of said addressee, or of both identities, to inhibit placing said copy protect restriction in response to said further control signal.

7. Apparatus as described in claim 1, wherein said voice mail means is responsive to said further control signal to place a self destruct restriction on said stored voice signal, said voice mail means thereafter responding to said self destruct restriction to automatically erase said stored voice signal after access by said addressee.

8. Apparatus as described in claim 7, wherein said voice mail means is responsive to a function of the identity of the originator of said stored voice signal or of said addressee, or of both identities, to inhibit placing said self destruct restriction in response to said further control signal.

9. Apparatus as described in claim 1, wherein said voice mail means is responsive to another further control signal to delete previous restrictions on said stored voice signal.

10. Apparatus for storing and forwarding voice signals, comprising:
(a) voice mail means for storage and retrieval of said voice signals, said voice mail means having a send state for sending a previously stored voice signal to a selected addressee, a send copy state for selection of a new selected addressee to receive a copy of said stored voice signal, and a send options state for selection of options for processing said previously stored voice;
(b) station means for input and output of said voice signals;
(c) said station means further comprising signal input means for input of a copy control signal, said voice mail means responding to said copy control signal to receive information identifying said new selected addressee, append a predetermined header to said stored voice signal, and to send said recorded voice signal and said header to said new selected addressee, whereby when said new selected addressee receives said stored voice signal it will be identified as a copy and not a message originally addressed to said new addressee.

11. A method for controlling access to a recorded voice signal in a voice mail system, comprising the steps of:

(a) recording a voice signal for forwarding to a selected addressee; and,
(b) labelling said recorded voice signal with a restrictive label, said voice mail system responding to said restrictive label to restrict said selected addressee's access to said recorded voice signal.

12. A method as described in claim 11 wherein said voice mail system is responsive to said restrictive label to at least restrict said selected addressee from erasing said recorded voice signal until said selected addressee records a reply voice signal to said recorded voice signal.

13. A method as described in claim 11 wherein said voice mail system is responsive to said restrictive label to restrict said selected addressee from forwarding said recorded voice signal to other system users.

14. A method as described in claim 11 wherein said voice mail system is responsive to said label to automatically erase said recorded voice signal after access by said selected addressee.

15. A method as described in claim 11 wherein said response of said voice mail system is modified as a function of the identity of the originator of said recorded voice, or of said selected addressee, or both identities.

16. Apparatus for storing and forwarding voice signals, comprising:
(a) voice mail means for:
(a1) storing and retrieving said voice signals;
(a2) sending a previously recorded voice signal to a selected addressee; and,
(a3) selectively restricting the access of said addressee to said previously recorded voice signal; and,
(b) station means for input of said voice signals and control signals for control of said voice mail means, said control signals including restriction control signals for controlling the level of restriction placed on said access of said addressee to said previously stored voice signal.

17. Apparatus as described in claim 16, wherein said voice mail means is responsive to said restriction control signals to place a mandatory response restriction on said stored voice signal, said voice mail means thereafter responding to said mandatory response restriction to restrict access by said addressee to at least the extent that said addressee cannot erase said stored voice signal until said addressee has recorded a reply voice signal to said stored voice signal.

18. Apparatus as described in claim 2, wherein said voice mail means is responsive to said restriction control signals to place one of a plurality of levels of mandatory response restriction on said stored voice signal.

19. Apparatus as described in claim 18, where in said voice mail system is responsive to said restriction control signals to select one of said levels of restriction as a function of the identity of the originator of said stored voice signal, or of said addressee, or of both identities.

20. Apparatus as described in claim 16, wherein said voice mail means is responsive to said restriction control signals to place a copy protect restriction on said stored voice signal, said voice mail means thereafter responding to said copy protect restriction to restrict said addressee from forwarding said stored voice signal to other system users.

21. Apparatus as described in claim 20, wherein said voice mail means is responsive to a function of the identity of the originator of said stored voice signal, or of said addressee, or of both identities, to inhibit placing said copy protect restriction in response to said further control signal.

22. Apparatus as described in claim 1, wherein said voice mail means is responsive to said restriction control signals to place a self destruct restriction on said stored voice signal, said voice mail means thereafter responding to said self destruct restriction to automatically erase said stored voice signal after access by said addressee.

23. Apparatus as described in claim 22, wherein said voice mail means is responsive to a function of the identity of the originator of said stored voice signal or of said addressee, or of both identities, to inhibit placing said self destruct restriction in response to said restriction control signal.

24. Apparatus as described in claim 16, wherein said voice mail means is responsive to another restriction control signal to delete previous restrictions on said stored voice signal.

* * * * *